United States Patent
Annamalai et al.

(10) Patent No.: US 9,661,602 B2
(45) Date of Patent: *May 23, 2017

(54) SYSTEM AND METHOD FOR DETERMINING DEVICE LOCATION IN AN IP-BASED WIRELESS TELECOMMUNICATIONS NETWORK

(71) Applicant: T-Mobile USA, Inc., Bellevue, WA (US)

(72) Inventors: Magesh Annamalai, Renton, WA (US); Zhengyi Jin, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 265 days.

This patent is subject to a terminal disclaimer.

(21) Appl. No.: 13/753,472

(22) Filed: Jan. 29, 2013

(65) Prior Publication Data
US 2013/0237250 A1    Sep. 12, 2013

Related U.S. Application Data

(63) Continuation of application No. 12/089,905, filed as application No. PCT/US2006/041226 on Oct. 20, 2006, now Pat. No. 8,364,746.
(Continued)

(51) Int. Cl.
*G06F 15/16* (2006.01)
*H04W 64/00* (2009.01)
(Continued)

(52) U.S. Cl.
CPC ............. *H04W 64/00* (2013.01); *H04W 4/02* (2013.01); *H04W 4/22* (2013.01); *H04W 76/007* (2013.01); *H04L 67/18* (2013.01); *H04W 80/04* (2013.01)

(58) Field of Classification Search
None
See application file for complete search history.

(56) References Cited

U.S. PATENT DOCUMENTS 5,724,660 A    3/1998 Kauser et al.
6,002,679 A    12/1999 Liu et al.
(Continued)

FOREIGN PATENT DOCUMENTS

EP    1583374    10/2005
EP    2051556    4/2009
(Continued)

OTHER PUBLICATIONS

Schulzrinne et al. "Emergency Services for Internet Telephony Systems," Oct. 18, 2004, Network Working Group, Internet Draft, pp. 1-20.
(Continued)

*Primary Examiner* — Scott B Christensen
(74) *Attorney, Agent, or Firm* — Perkins Coie LLP

(57) ABSTRACT

A system and method determines a geographic position of a mobile device in communication with an IP-based wireless telecommunications network. A wireless connection between the mobile device and the IP-based wireless telecommunications network is established when the mobile device registers with a network controller (NC) through an access point (AP). When a geographical position is needed for the mobile device (e.g., a 911 call), messages are exchanged between the NC and the SMLC where the SMLC retrieves information from a database that is used to identify the geographic position of the mobile device. The database can store a variety of information related to mobile devices such as: last known position, IP address, MAC address, device or subscriber identifier, last CGI, etc. The geographical position is communicated back to the NC, which can
(Continued)

then forward the position information to a switch for processing such as for 911 calls.

20 Claims, 9 Drawing Sheets

Related U.S. Application Data

(60) Provisional application No. 60/728,972, filed on Oct. 21, 2005.

(51) Int. Cl.
*H04W 4/02* (2009.01)
*H04W 4/22* (2009.01)
*H04W 76/00* (2009.01)
H04W 80/04 (2009.01)
H04L 29/08 (2006.01)

(56) References Cited

U.S. PATENT DOCUMENTS

| | | | |
|---|---|---|---|
| 6,104,712 A | 8/2000 | Robert et al. |
| 6,119,012 A | 9/2000 | Amirijoo |
| 6,222,483 B1 | 4/2001 | Twitchell et al. |
| 6,249,252 B1 | 6/2001 | Dupray |
| 6,252,545 B1 | 6/2001 | Da et al. |
| 6,463,288 B1 | 10/2002 | Havinis et al. |
| 6,542,819 B1 | 4/2003 | Kovacs et al. |
| 6,603,976 B1 | 8/2003 | Amirijoo et al. |
| 6,603,978 B1 | 8/2003 | Carlsson et al. |
| 6,665,611 B1 | 12/2003 | Oran et al. |
| 6,671,514 B1 | 12/2003 | Cedervall et al. |
| 6,690,659 B1 | 2/2004 | Ahmed et al. |
| 6,711,417 B1 | 3/2004 | Gorman et al. |
| 6,801,778 B2 | 10/2004 | Koorapaty et al. |
| 7,151,941 B2 | 12/2006 | Vanttinen et al. |
| 7,158,500 B2 | 1/2007 | Annamalai |
| 7,177,399 B2 | 2/2007 | Dawson et al. |
| 7,187,923 B2 | 3/2007 | Mousseau et al. |
| 7,194,354 B1 | 3/2007 | Oran et al. |
| 7,245,900 B1 | 7/2007 | Lamb et al. |
| 7,272,500 B1 | 9/2007 | Walker |
| 7,283,822 B2 | 10/2007 | Gallagher et al. |
| 7,304,985 B2 | 12/2007 | Sojka et al. |
| 7,313,143 B1 | 12/2007 | Bruno |
| 7,317,910 B2 | 1/2008 | Niemenmaa et al. |
| 7,336,668 B2 | 2/2008 | Adams |
| 7,336,962 B2 | 2/2008 | Levitan |
| 7,353,034 B2 | 4/2008 | Haney |
| 7,369,859 B2 | 5/2008 | Gallagher |
| 7,433,673 B1 | 10/2008 | Everson et al. |
| 7,436,789 B2 | 10/2008 | Caliskan et al. |
| 7,466,986 B2 | 12/2008 | Halcrow et al. |
| 7,577,431 B2 | 8/2009 | Jiang |
| 7,593,605 B2 | 9/2009 | King et al. |
| 7,606,555 B2 | 10/2009 | Walsh et al. |
| 7,610,011 B2 | 10/2009 | Albrett |
| 7,613,155 B2 | 11/2009 | Shim |
| 7,620,404 B2 | 11/2009 | Chesnais et al. |
| 7,640,008 B2 | 12/2009 | Gallagher et al. |
| 7,653,394 B2 | 1/2010 | McMillin |
| 7,664,494 B2 | 2/2010 | Jiang |
| 7,676,394 B2 | 3/2010 | Ramer et al. |
| 7,688,261 B2 | 3/2010 | DiEsposti |
| 7,714,778 B2 * | 5/2010 | Dupray ................... 342/357.31 |
| 7,768,963 B2 | 8/2010 | Alizadeh-Shabdiz |
| 7,856,315 B2 | 12/2010 | Sheha et al. |
| 7,903,029 B2 | 3/2011 | Dupray |
| 7,904,096 B2 | 3/2011 | Shyr et al. |
| 7,949,326 B2 | 5/2011 | Gallagher et al. |
| 7,974,639 B2 | 7/2011 | Burroughs et al. |
| 8,116,291 B2 | 2/2012 | Annamalai et al. |
| 8,145,183 B2 | 3/2012 | Barbeau et al. |
| 8,213,957 B2 | 7/2012 | Bull et al. |
| 8,364,746 B2 | 1/2013 | Annamalai et al. |
| 8,369,266 B2 | 2/2013 | Jin et al. |
| 8,509,731 B2 | 8/2013 | Kholaif et al. |
| 8,571,043 B2 | 10/2013 | Horner |
| 2002/0019698 A1 | 2/2002 | Vilppula et al. |
| 2002/0064141 A1 | 5/2002 | Sakakura |
| 2002/0077144 A1 | 6/2002 | Keller et al. |
| 2002/0123354 A1 | 9/2002 | Nowak |
| 2003/0009385 A1 | 1/2003 | Tucciarone et al. |
| 2003/0016648 A1 | 1/2003 | Lindsay et al. |
| 2003/0032404 A1 | 2/2003 | Wager et al. |
| 2003/0058844 A1 | 3/2003 | Sojka et al. |
| 2003/0074471 A1* | 4/2003 | Anderson ......... H04L 29/12009 709/245 |
| 2003/0095069 A1 | 5/2003 | Stilp |
| 2003/0139182 A1 | 7/2003 | Bakkeby et al. |
| 2003/0216143 A1 | 11/2003 | Roese et al. |
| 2003/0222819 A1* | 12/2003 | Karr et al. ................... 342/457 |
| 2004/0062264 A1 | 4/2004 | Adams |
| 2004/0076157 A1 | 4/2004 | Sojka et al. |
| 2004/0087315 A1 | 5/2004 | Dufva et al. |
| 2004/0102196 A1 | 5/2004 | Weckstrom et al. |
| 2004/0114577 A1 | 6/2004 | Sojka et al. |
| 2004/0122730 A1 | 6/2004 | Tucciarone et al. |
| 2004/0142704 A1 | 7/2004 | Scholz |
| 2004/0157590 A1 | 8/2004 | Lazaridis et al. |
| 2004/0162896 A1 | 8/2004 | Cen et al. |
| 2004/0166856 A1 | 8/2004 | Niemenmaa |
| 2004/0198386 A1 | 10/2004 | Dupray |
| 2004/0202120 A1 | 10/2004 | Hanson |
| 2004/0202194 A1 | 10/2004 | Annamalai |
| 2004/0203853 A1 | 10/2004 | Sheynblat |
| 2004/0203915 A1 | 10/2004 | van Diggelen et al. |
| 2004/0224702 A1 | 11/2004 | Chaskar |
| 2004/0240430 A1 | 12/2004 | Lin et al. |
| 2004/0259566 A1 | 12/2004 | Maanoja et al. |
| 2005/0003831 A1 | 1/2005 | Anderson |
| 2005/0059415 A1 | 3/2005 | Easo et al. |
| 2005/0066044 A1 | 3/2005 | Chaskar et al. |
| 2005/0070306 A1 | 3/2005 | Kim et al. |
| 2005/0075116 A1 | 4/2005 | Laird et al. |
| 2005/0079821 A1 | 4/2005 | Bi |
| 2005/0130673 A1 | 6/2005 | Annamalai |
| 2005/0136943 A1 | 6/2005 | Banerjee et al. |
| 2005/0138144 A1 | 6/2005 | Sethi |
| 2005/0148342 A1 | 7/2005 | Sylvain |
| 2005/0153687 A1 | 7/2005 | Niemenmaa et al. |
| 2005/0159153 A1 | 7/2005 | Mousseau et al. |
| 2005/0170851 A1 | 8/2005 | Melpignano et al. |
| 2005/0181805 A1* | 8/2005 | Gallagher ................... 455/456.1 |
| 2005/0186948 A1 | 8/2005 | Gallagher et al. |
| 2005/0192024 A1 | 9/2005 | Sheynblat |
| 2005/0255866 A1 | 11/2005 | Dupuy et al. |
| 2005/0272424 A1 | 12/2005 | Gallagher et al. |
| 2005/0286466 A1 | 12/2005 | Tagg et al. |
| 2006/0009235 A1 | 1/2006 | Sheynblat et al. |
| 2006/0014517 A1 | 1/2006 | Barclay et al. |
| 2006/0014548 A1 | 1/2006 | Bolin et al. |
| 2006/0015513 A1 | 1/2006 | Poyhonen et al. |
| 2006/0025158 A1 | 2/2006 | Leblanc et al. |
| 2006/0029296 A1 | 2/2006 | King et al. |
| 2006/0030290 A1 | 2/2006 | Rudolf et al. |
| 2006/0052115 A1 | 3/2006 | Khushu |
| 2006/0062363 A1 | 3/2006 | Albrett |
| 2006/0098899 A1 | 5/2006 | King et al. |
| 2006/0105776 A1 | 5/2006 | Burke |
| 2006/0121916 A1 | 6/2006 | Aborn et al. |
| 2006/0172732 A1 | 8/2006 | Nylander et al. |
| 2006/0178146 A1 | 8/2006 | Lee et al. |
| 2006/0194594 A1 | 8/2006 | Ruutu et al. |
| 2006/0212217 A1 | 9/2006 | Sheha et al. |
| 2006/0245406 A1 | 11/2006 | Shim |
| 2006/0258365 A1 | 11/2006 | Cha et al. |
| 2006/0258369 A1 | 11/2006 | Burroughs et al. |
| 2006/0276201 A1 | 12/2006 | Dupray |
| 2006/0286984 A1 | 12/2006 | Bonner |
| 2006/0293066 A1 | 12/2006 | Edge et al. |
| 2007/0032249 A1 | 2/2007 | Krishnamurthi et al. |
| 2007/0060097 A1 | 3/2007 | Edge et al. |

(56) References Cited

U.S. PATENT DOCUMENTS

| | | |
|---|---|---|
| 2007/0060114 A1 | 3/2007 | Ramer et al. |
| 2007/0061198 A1 | 3/2007 | Ramer et al. |
| 2007/0061242 A1 | 3/2007 | Ramer et al. |
| 2007/0061243 A1 | 3/2007 | Ramer et al. |
| 2007/0061244 A1 | 3/2007 | Ramer et al. |
| 2007/0061245 A1 | 3/2007 | Ramer et al. |
| 2007/0061246 A1 | 3/2007 | Ramer et al. |
| 2007/0061247 A1 | 3/2007 | Ramer et al. |
| 2007/0061303 A1 | 3/2007 | Ramer et al. |
| 2007/0061317 A1 | 3/2007 | Ramer et al. |
| 2007/0072624 A1 | 3/2007 | Niemenmaa et al. |
| 2007/0073717 A1 | 3/2007 | Ramer et al. |
| 2007/0073718 A1 | 3/2007 | Ramer et al. |
| 2007/0073719 A1 | 3/2007 | Ramer et al. |
| 2007/0073722 A1 | 3/2007 | Ramer et al. |
| 2007/0073723 A1 | 3/2007 | Ramer et al. |
| 2007/0123237 A1 | 5/2007 | Cacioppo et al. |
| 2007/0155489 A1 | 7/2007 | Beckley et al. |
| 2007/0167174 A1 | 7/2007 | Halcrow et al. |
| 2007/0178913 A1 | 8/2007 | Niemenmaa et al. |
| 2007/0189497 A1 | 8/2007 | Bareis |
| 2007/0192294 A1 | 8/2007 | Ramer et al. |
| 2007/0192318 A1 | 8/2007 | Ramer et al. |
| 2007/0198485 A1 | 8/2007 | Ramer et al. |
| 2007/0217454 A1 | 9/2007 | Horner |
| 2007/0239724 A1 | 10/2007 | Ramer et al. |
| 2007/0288427 A1 | 12/2007 | Ramer et al. |
| 2008/0009268 A1 | 1/2008 | Ramer et al. |
| 2008/0014956 A1 | 1/2008 | Balasubramanian |
| 2008/0045236 A1 | 2/2008 | Nahon et al. |
| 2008/0076420 A1 | 3/2008 | Khetawat et al. |
| 2008/0076429 A1 | 3/2008 | Comstock et al. |
| 2008/0081620 A1 | 4/2008 | Lu et al. |
| 2008/0096594 A1 | 4/2008 | Vinding |
| 2008/0108319 A1 | 5/2008 | Gallagher |
| 2008/0146245 A1 | 6/2008 | Appaji |
| 2008/0192696 A1 | 8/2008 | Sachs et al. |
| 2008/0254810 A1 | 10/2008 | Fok et al. |
| 2008/0280624 A1 | 11/2008 | Wrappe |
| 2009/0005061 A1 | 1/2009 | Ward et al. |
| 2009/0054070 A1 | 2/2009 | Gallagher et al. |
| 2009/0171583 A1 | 7/2009 | DiEsposti |
| 2009/0185669 A1 | 7/2009 | Zitnik et al. |
| 2009/0275348 A1 | 11/2009 | Weinreich et al. |
| 2009/0311987 A1 | 12/2009 | Edge et al. |
| 2010/0046406 A1 | 2/2010 | Annamalai et al. |
| 2010/0069099 A1 | 3/2010 | Dunn et al. |
| 2010/0150120 A1 | 6/2010 | Schlicht et al. |
| 2010/0220700 A1 | 9/2010 | Hodroj et al. |
| 2010/0289640 A1 | 11/2010 | Annamalai |
| 2010/0291947 A1 | 11/2010 | Annamalai |
| 2010/0331017 A1 | 12/2010 | Ariga |
| 2011/0039576 A1 | 2/2011 | Prakash et al. |
| 2011/0047033 A1 | 2/2011 | Mahaffey et al. |
| 2011/0051658 A1 | 3/2011 | Jin et al. |
| 2011/0051665 A1 | 3/2011 | Huang |
| 2011/0111726 A1 | 5/2011 | Kholaif et al. |
| 2011/0159886 A1 | 6/2011 | Kangas et al. |
| 2011/0200022 A1 | 8/2011 | Annamalai |
| 2012/0096490 A1 | 4/2012 | Barnes, Jr. et al. |
| 2012/0116677 A1 | 5/2012 | Higgison et al. |
| 2012/0140749 A1 | 6/2012 | Caldwell et al. |
| 2012/0320888 A1 | 12/2012 | Annamalai et al. |
| 2013/0150085 A1 | 6/2013 | Jin et al. |
| 2014/0295894 A1 | 10/2014 | Annamalai |
| 2015/0181375 A1 | 6/2015 | Annamalai |

FOREIGN PATENT DOCUMENTS

| | | |
|---|---|---|
| JP | 10239416 | 9/1998 |
| KR | 1020040063234 A | 7/2004 |
| WO | WO-0027143 | 5/2000 |
| WO | 2005004520 A2 | 1/2005 |
| WO | WO-2005004528 | 1/2005 |
| WO | WO-2005060292 | 6/2005 |
| WO | 2006102784 A1 | 10/2006 |

OTHER PUBLICATIONS

European Patent Office, Extended European Search Report, EP Patent Application 06826444.9, mailed Sep. 12, 2012, 8 pages.

International Search Report and Written Opinion, International Application No. PCT/2006/41226, filed Oct. 20, 2006, Applicant: T-Mobile USA, Inc., Date of Mailing: Dec. 4, 2007, 18 pages.

Raja, K., et al. "We Know," IEEE Communication Engineer, Jun./Jul. 2004, 6 pages.

International Search Report and Written Opinion, International Application No. PCT/2007/82156, filed Oct. 22, 2007, Applicant: T-Mobile USA, Inc., Date of Mailing: May 28, 2008, 12 pages.

International Search Report and Written Opinion, International Application No. PCT/US2007/82133, Applicant: T-Mobile USA, Inc., filed Oct. 22, 2007, Date of Mailing: Apr. 29, 2008, 9 pages.

International Search Report and Written Opinion, International Application No. PCT/US2007/66579, filed Apr. 12, 2007, Applicant: T-Mobile, Inc., Date of Mailing: Sep. 9, 2008, 9 pages.

"IP Multimedia Subsystem," Wikipedia, http://wikipedia.org/wiki/IP_Multimedia_Subsystem, 13 pages. [Last Accessed May 5, 2010].

"Enabler Release Definition for Secure UserPlane for Location," Candidate Version 1.0, Open Mobile Alliance, Jan. 22, 2007, 17 pages.

"Google Search of Location of Mobile," http://www.google.com/search?q=location+of+mobile&sourceid=ie7&rls=com.microsoft:en-us:IE-SearchBox&ie=&oe= [Last Accessed Jun. 8, 2010], 2 pages.

Annamalai, Magesh. "Method and Delivery of UMA Value Added Location Services via SUPL," U.S. Appl. No. 60/853,086, filed Oct. 20, 2006, 15 pages.

"Secure User Plane for Location Requirements," Candidate Version 1.0, Open Mobile Alliance, Jun. 16, 2006, 80 pages.

"Secure User Plane for Location Architecture," Candidate Version 1.0, Open Mobile Alliance, Jan. 22, 2007, 80 pages.

"The 3GPP Standard for Convergence-Diagram," UMA Universal Mobile Access, http://www.umatoday.com/img/diagrams/umaServices.jpg, [First Accessed Oct. 17, 2007], 1 page.

"The 3GPP Standard for Convergence-Dual Mode Handsets," UMA Universal Mobile Access, UMA Today, 2007, 2 pages.

"The 3GPP Standard for Convergence-Femtocells," UMA Universal Mobile Access, UMA Today, 2007, 2 pages.

"The 3GPP Standard for Convergence-Softmobiles," UMA Universal Mobile Access, UMA Today, 2007, 2 pages.

"The 3GPP Standard for Convergence-Terminal Adaptors," UMA Universal Mobile Access, UMA Today, 2007, 2 pages.

"UserPlane for Location Protocol," Candidate Version 1.0, Open Mobile Alliance, Jan. 22, 2007, 56 pages.

Dyoub, J. et al. "Dueling Architectures: Control plane vs. Userplane," HP Invent, 2004, 2 pages.

Gum, Arnold et al. "Infrastructure Wireless Choices for LBS," GPS World, Mar. 2, 2006, http://www.gpsworld.com/wireless/infrastructure/wireless-choices-lbs-3750?print=1, [Last Accessed Apr. 28, 2010], 5 pages.

International Search Report and Written Opinion, International Application No. PCT/US2007/82136, Applicant: T-Mobile USA, Inc., filed Oct. 22, 2007, Date of Mailing: Mar. 11, 2008, 11 pages.

Spinney, Jonathan. "Wireless Location Uses in the User Plane and Control Plane," The Location Based Services Community, Jun. 27, 2005, 3 pages.

International Search Report and Written Opinion, International Application No. PCT/US2010/035010, Applicant: T-Mobile USA, Inc., filed May 14, 2010, Date of Mailing: Dec. 22, 2010, 10 pages.

International Search Report and Written Opinion, International Application No. PCT/US2010/035014, Applicant: T-Mobile USA, Inc., filed May 14, 2010, Date of Mailing: Dec. 28, 2010, 11 pages.

(56) References Cited

OTHER PUBLICATIONS

Martin-Escalona, et al. "Delivery of Non-Standardized Assistance Data in E-OTD/GNSS Hybrid Location Systems," IEEE 2002, pp. 1-5.
Steinfield. "The Development of Location Based Services in Mobile Commerce," Elife after the dot.com bust, Berlin, Springer, 2004, pp. 1-15.
Extended European Search Report, EP Patent Application 07760606.9, mailed Jan. 23, 2013, 8 pages.
European Patent Office, Extended European Search Report, EP Patent Application 10775643.9, mailed Dec. 1, 2016, 10 pages.
European Patent Office, Extended European Search Report, EP Patent Application 07868537.7, mailed Mar. 7, 2017, 9 pages.

* cited by examiner

911 Call Flow

SYSTEM AND METHOD FOR DETERMINING DEVICE LOCATION IN AN IP-BASED WIRELESS TELECOMMUNICATIONS NETWORK

RELATED APPLICATION

This utility patent application claims the benefit under 35 United States Code §119(e) of U.S. Provisional Patent Application No. 60/728,972, which was filed Oct. 21, 2005.

FIELD OF THE INVENTION

The present invention relates to determination of a mobile device's location in an IP-based wireless telecommunications network. More specifically, the present invention is related to systems and methods for determining a geographical location of a mobile device by retrieving information related to the mobile device from a database, processing the retrieved, information to identify a position, and communicating the position, information to a switch for further handling.

BACKGROUND

A variety of technologies enable telecommunication services to be offered using internet Protocol (IP). Commonly referred to as Voice over IP, or VoIP, such technologies enable telecommunications on any public or private IP network, including the internet. VoIP technology permits a user to receive IP-based telecommunications services through a variety of devices, including a desktop computer, a notebook computer, an analog handset used in conjunction with a VoIP telephone adapter, a VoIP-enabled handset, or other like device.

Increasingly, mobile devices, such as notebook computers, personal digital assistants (PDAs), wireless handholds, wireless handsets, or other similar devices, are also being enabled to receive IP-based telecommunications services. Such services are provided by enabling the mobile device to communicate with a wireless router and access any IP-based wireless access network, such as a network based on the IEEE 802.16 (WiMAX), IEEE 802.20 Mobile Broadband Wireless Access (MBWA), Ultra Wideband (UWB), 802.11 wireless fidelity (Wi-Fi), and Bluetooth standards.

Moreover, dual-mode mobile telecommunications devices may be enabled to communicate with any IP-based wireless access network. For instance, Unlicensed Mobile Access (UMA) technology allows wireless service providers to merge cellular networks, such as Global System for Mobile Communications (GSM) networks, and IP-based wireless networks into one seamless service with one mobile device, one user Interface, and a common set of network services for both voice and data. UMA technology has recently been accepted into release 6 of the 3rd Generation Partnership Project (3GPP) standard in a General Access Network (GAN). With UMA or GAN solutions, subscribers may move between cellular networks and IP-based wireless networks with seamless voice and data session continuity as transparently as they move between cells within the cellular network Seamless in-call handover between the IP-based wireless network and cellular network ensures that the user's location and mobility do not affect the services delivered to the user. Services may be identical whether connected over the IP-based wireless network or the cellular network. UMA technology effectively creates a parallel radio access network, the UMA network, which interfaces to the mobile core network using standard mobility-enabled interfaces. The mobile core network remains unchanged. The common mobile core network makes it possible for the service provider to have full service and operational transparency. The existing service provider Business Support Systems (BSS), service delivery systems, content services, regulatory compliance systems, and Operation Support Systems (OSS) can support the UMA network without change. Service enhancements and technology evolution of the mobile core network apply transparently to both cellular access and UMA.

The present disclosure has identified a number of problems in locating a mobile device on an IP-based wireless telecommunications network and providing location based services to the mobile device. Telecommunications service providers would like to offer location-based services that deliver information specific to the mobile device's current location. Telecommunications service providers also wish to route certain calls, such as 911 or "emergency" calls, to an office that is geographically relevant to the user of a mobile device. The present disclosure has identified the above and other needs for service providers who operate IP-based wireless telecommunications networks to implement systems and methods that determine the mobile device's location on an IP-based wireless telecommunications network.

BRIEF DESCRIPTION OF THE DRAWINGS

Non-limiting and non-exhaustive embodiments are described with reference to the following drawings.

DETAILED DESCRIPTION

Figure 1:
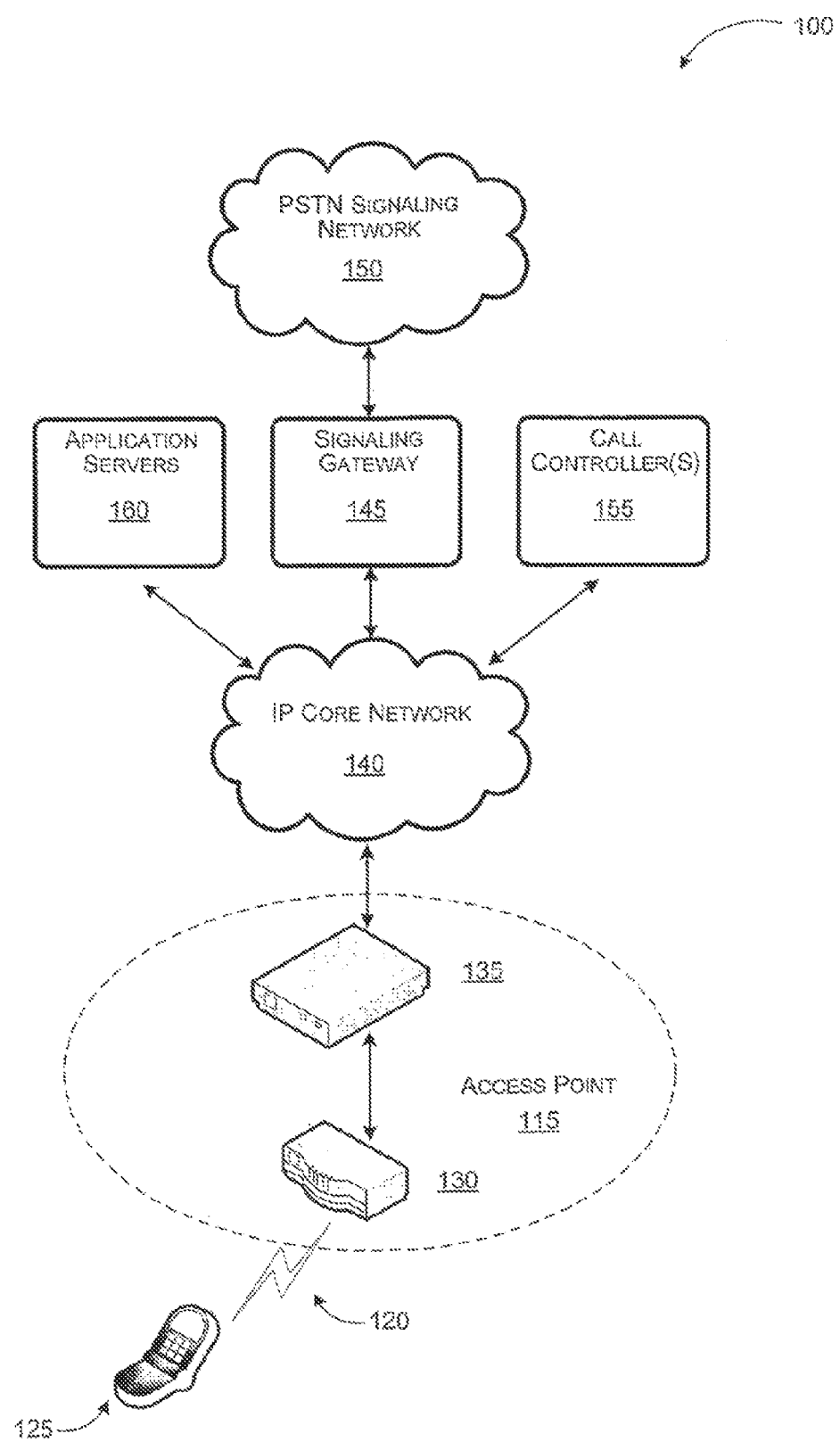
FIG. 1 illustrates an example Voice over IP system.

The present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Briefly stated, the present disclosure relates to a system and method for locating the geographic position of a mobile device when in communication with an IP-based wireless telecommunications network. A wireless connection between the mobile device and the IP-based wireless telecommunications network is established when the mobile device registers with a network controller (NC) through an access point (AP). When a geographical position is needed for the mobile device (e.g., a 911 call), messages are exchanged between the NC and the SMLC, where the SMLC retrieves information from a database that is used to identify the geographic position of the mobile device. The database can store a variety of information related to mobile devices such as: last known position, IP address, MAC address, a mobile or subscriber identifier (such as an International Mobile Subscriber Identity (IMSI), last CGI, etc. The geographical position is communicated back to the NC, which can then forward the position information to a switch for processing such as for 911 calls.

Example IP-based wireless communication networks include VoIP networks and/or converged wireless networks that include a combination of cellular networks and IP-based wireless telecommunications network (e.g., unlicensed mobile access or UMA network technologies). A mobile device can access a VoIP network via a wireless connection with an access point. A dual-mode wireless telecommunication device can access either a cellular network or an IP-based wireless telecommunications network, such as UMA network, thereby allowing mobile devices to roam voice, data and multimedia communications between conventional cellular networks and wireless local area network access points at home, in the office and at public areas (e.g., hot spots). Calls are transferred between the networks depending on whether the access point is in range or not, permitting users to transparently connect to the fastest or lowest cost network.

The positioning system may be useful when the mobile subscriber issues a 911 emergency call or when a mobile subscriber wishes to receive value added location based services (such as information regarding nearby restaurants, gas stations, entertainment complexes and similar locations of interest). In the case of emergency services the call is routed to a public safety answering point (PSAP) and is forwarded to the proper services. The PSAP receives the caller's phone number and the exact geographic location of the mobile device from which the call was made.

Example VoIP and IP-Based Wireless Telecommunications Networks

FIG. 1 illustrates the components of a generalized Voice over Internet Protocol (VoIP) system 100 for mobile communication devices. The system comprises one or more access points (APs) 115 that can accept communications 120 from mobile devices 125. The access point includes a wireless router 130 and a broadband modem 135 that enable connection to an Internet Protocol (IP) network 140. IP network 140 may be one or more public networks, private networks, or combination of public and private networks. IP packets that carry communications from the mobile device 125 are received a the access point 115 and transported through the IP network 140 to a signaling gateway 145. Signaling gateway 145 can typically be operated by a service provided and converts the VoIP signal to a traditional phone service signal. The phone signal is then conveyed to the intended recipient via a public switched telephone network (PSTN) 150. A call controller 155 that is located in the service provider's network provided call logical and call control functions. An application server 160 that is located in the service provider's network provides logic and execution of one or more applications or services that are offered by the server provider, such as implementing various access and security rules.

The VoIP system depicted in FIG. 1 is an architecture that broadly enables a mobile device to receive IP-formatted telecommunication services. One example application of the described technology is for an Unlicensed Mobile Access (UMA) network that allows cellular service providers to offer their products and services seamlessly over Internet-connected broadband networks. Mobile devices may utilise licensed spectrums (such as spectrums for cellular communications) and alternate licensed, semilicensed and unlicensed spectrums (such as spectrums for IP-based wireless communication). For example, dual-mode cellular phones may access a cellular network, such as a GSM network, or an IP-based wireless network, such as a network based on the IEEE 802.16 (WiMAX), IEEE 802.20 Mobile Broadband Wireless Access (MBWA), Ultra Wideband (UWB), 802.11 wireless fidelity (Wi-Fi), or Bluetooth standards. The IP-based networks are accessed via wireless access points that are typically connected to a DSL (Digital Subscriber Line) modem, a cable modem, a satellite modem, or any other broadband Internet connection. The access points may be public or private, and may be located in a subscriber's home, in other apartments or residences, in public locations such as coffee shops, libraries, or schools, or in corporate locations.

When a mobile device accesses an IP-based wireless network, information is initially formatted in the cellular system's native protocol and then encapsulated into Internet Protocol (IP) packets, transmitted to the access point, and communicated over the Internet to the cellular service providers mobile core network. Such transmissions bypass the service provider's existing network of radio towers. Because the same cellular protocols are used in communications involving IP access points as with traditional radio towers, the cellular service provider maintains a large degree of system compatibility even though using an IP-based network. The systems of the cellular service provider that deliver content and handle mobility may not even need to be aware that a subscriber's mobile device is on an IP-based wireless telecommunications network. The system may instead assume the mobile device is on its native cellular network. The IP network is therefore abstracted with respect to the cellular network, regardless of whether the mobile device connects to the cellular network via a base station (for licensed spectrum access) or a wireless access point (for licensed, semilicensed and/or unlicensed spectrum access).

A non-exhaustive list of products and services available on IP-based wireless telecommunications networks includes not only voice services, but also supplementary services like call forwarding and call waiting, text messaging services like SMS, and data-based services like ringtone downloads, game downloads, picture messaging, email and web browsing. Further, since a mobile device is connected to an IP network, a wide variety of data services available over such networks may be provided to the mobile device.

Figure 2A:
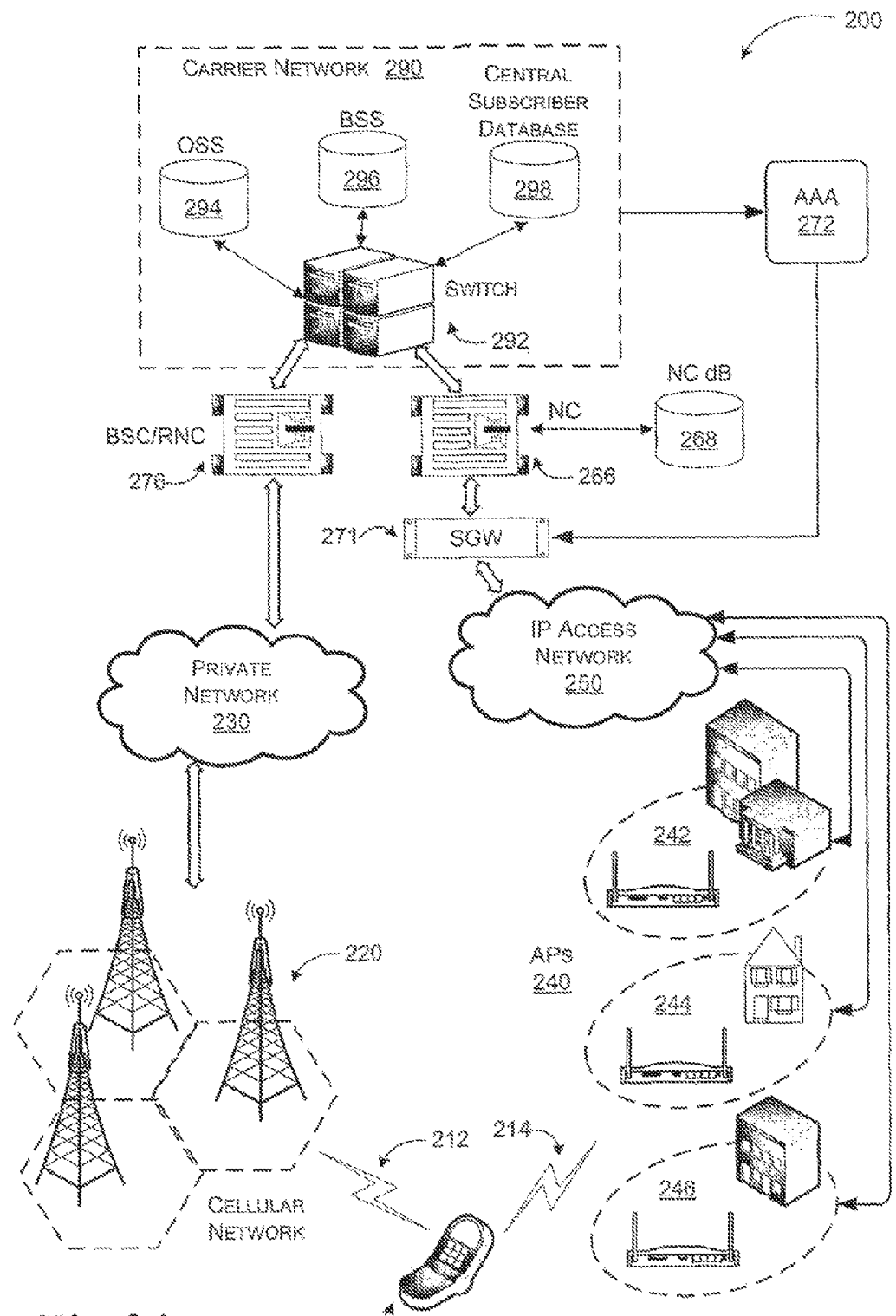
FIG. 2A illustrates an example converged wireless network combining a cellular network with an IP-based access network.

FIG. 2A is an illustration of a system 200 that combines a cellular telephone network with an IP-based wireless telecommunications network. The described system 200 accepts registration requests and call connections from a mobile device 210 to either a cellular telephone network or to an IP-based wireless network.

The example cellular telephone network includes one or more cell towers 220 that are configured to accept cellular communications 212 from mobile device 210. The cell towers 220 are connected to a controller (such as a base station controller/radio network controller (BSC/RNC)) 276 via a private network 230. The private network 230 can include a variety of connections such as T1 lines, a wide area network (WAN), a local area network (LAN), various network switches, and other similar components. Cell tower controller 276 controls network communication traffic to the carrier network 290, where all communications are managed. An example carrier network 290 includes a switch (such as a mobile switching center (MSC)) 292, which is configured to control data/call flows, perform load balancing, as well as other functions. A variety of system databases may also be accessed in the carrier network such as, e.g., an operation support subsystem (OSS) database 294, a business support system (BSS) database 296, and a central subscriber database that contains details of a carriers' subscribers (such as a home location register (HLR)) 298, for billing, call logging, etc.

The example IP-based wireless network includes one or more access points (APs) 240 that can accept IP communications 214 from mobile device 210. An access point can be configured as part of a wireless network in one or more locations such as a public network 242, a home network 244, or a private-business network 246. Each access point is coupled to an Internet Protocol (IP) network 250 through a broadband connection. IP packets that carry communications (data, voice, SMS, etc.) are routed from the access points to a security gateway (SGW) 271 through the IP network 250. The security gateway controls access to the network controller (such as a UMA Network Controller (UNC)) 266, which communicates with a database 268 for logging and/or accessing various data associated with communications. The network controller 266 is also configured to manage access with the carrier network 290 in a similar manner to that performed by the BSC/RNC 276.

Authentication of a request for access by a mobile device over the IP-based network is handled by the security gateway 271, which communicates with an authentication, accounting and authorization (AAA) module 272 as shown in FIG. 2A. Challenges and responses to requests for access by the mobile device are communicated between a central subscriber database 298 and the AAA module 272. When authorization is granted, the security gateway 271 communicates the assignment of an IP address to the mobile device 210 that requested access. Once the IP address is passed to the mobile device 210 by the security gateway 271, the public IP address assigned to the device is passed to the network controller 266.

Figure 2B:
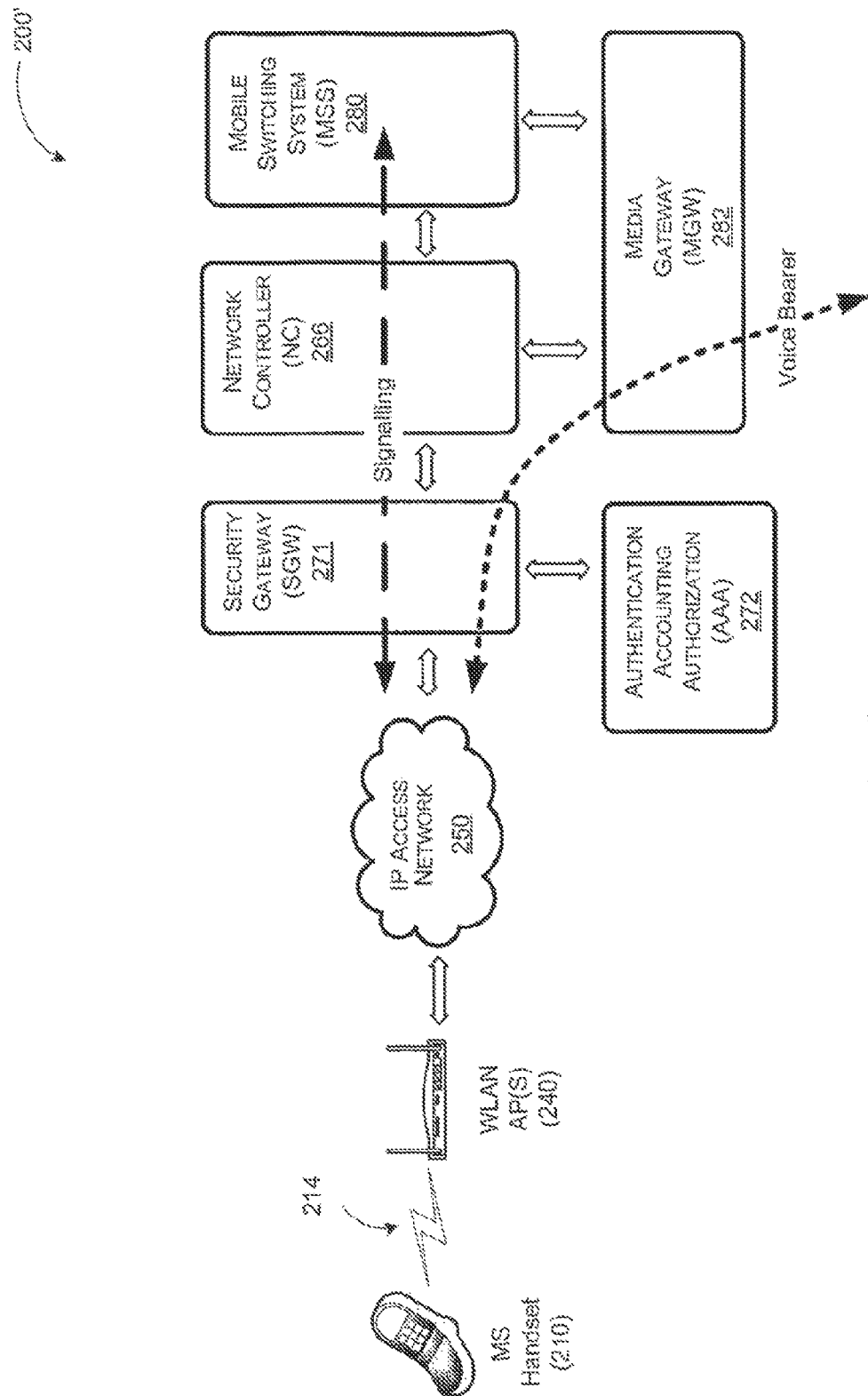
FIG. 2B illustrates another example converged wireless network combining a cellular network with an IP-based network.

FIG. 2B illustrates another example system that combines a cellular telephone network with an IP-based network (in this case, a UMA network). The described system 200' accepts registration requests and call connections from a mobile device 210 to either a cellular telephone network (nor shown) or to an IP-based wireless network. The system 200' includes one or more access points (AP) 240 that accept communications 214 from mobile device 210. Each access point is coupled to an IP network 250 through a broadband connection. IP network 250 routes communications (data, voice, SMS, etc.) between the access points and a security gateway (SGW) 271. The security gateway 271 controls access to the network controller 266, which communicates with a database (not shown) for logging and accessing various data associated with communications. Authentication, accounting, and authorization are handled by SGW 271 via AAA module 272, as previously described.

For the example system 200', the signaling path of an IP-based call is routed through the network controller 266 to a mobile switching system (MSS) 280, while the voice bearer path is routed through the network controller 266 to a media gateway (MGW) 282. The signaling portion of a communication governs various overhead aspects of the communication such as, for example, when the call starts, when the call stops, initiating a telephone ring, etc. The voice bearer portion of the communication contains the actual content (either data or voice information) of the communication. The MGW 282 controls the content flow between the service provider and the mobile device 210, while the MSS 280 controls the signaling flow (or controls overhead-related flow) between the service provider and the mobile device 210.

Figure 3:
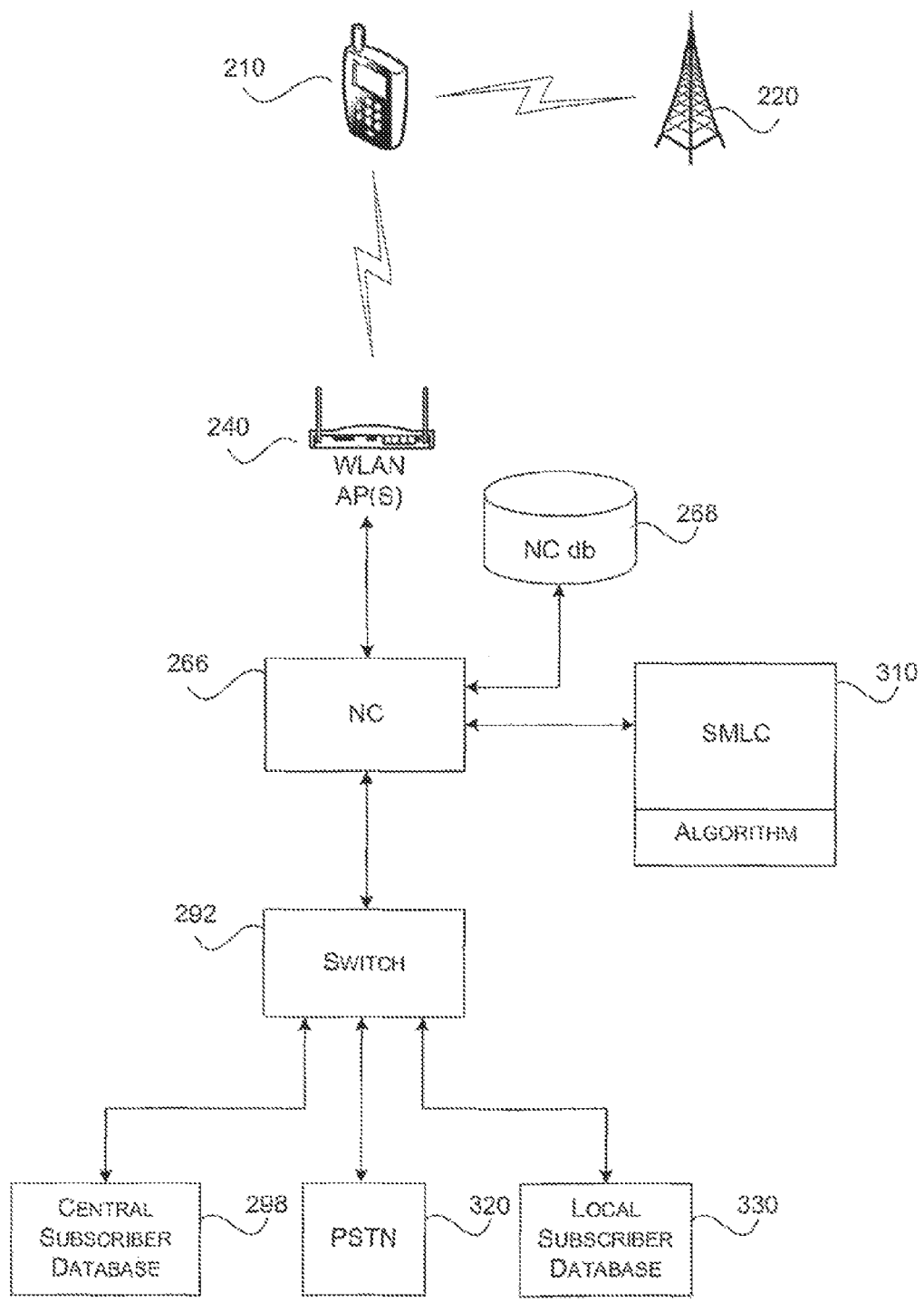
FIG. 3 illustrates a positioning system for locating the geographic position of a mobile device in either a wireless VoIP network or a converged cellular network and IP-based wireless telecommunications network.

FIG. 3 illustrates a positioning system for locating the geographic position of a mobile device in either a wireless VoIP network or a converged cellular network and IP-based wireless telecommunications network (in this case, a UMA network). The system includes a mobile device 210, one or more access points 240, a network controller (NC) 266, a data score such as an NC database 268, a serving mobile location center (SMLC) 310, and a switch 292. Switch 292 may access a central subscriber database 298, a public switched telephone network (PSTN) 320, and a local subscriber database 330. In one embodiment, mobile device 210 is a dual-mode unit capable of communicating on a cellular network via cell tower 220 and an IP-based wireless telecommunications network via access point 240. SMLC 310 includes a location algorithm for different access networks. NC database 268 may be internal or external relative to NC 266. NC database 268 may serve more than one NC 266.

The present disclosure is directed to an interface and a corresponding protocol between NC 266 and SMLC 310. In one example, a mobile subscriber issues a call from mobile device 210. The call is routed to switch 292 via access point 240 and NC 266. A series of messages are executed sequentially to locate the geographic position of mobile device 210. A perform location request (PLRQ) message is sent fern NC 266 to SMLC 310. SMLC 310 sends a positioning request to be retrieved from NC database 268. The NC database 268 provides location information associated with at least one of: a media access control (MAC) address associated with an access point, an identifier associated with mobile device 210, a cell global identity (CGI) associated with mobile device when the call is made, an internet protocol (IP) address associated with the access point, or any other combination thereof. SMLC 310 executes an algorithm to calculate the geographic position of mobile device 210 using the location information retrieved from NC database 268. The calculated position is returned to NC 266 via a perform location response (PLRS) message. NC 266 forwards the calculated location result to switch 292 via the PLRS.

Figure 4:
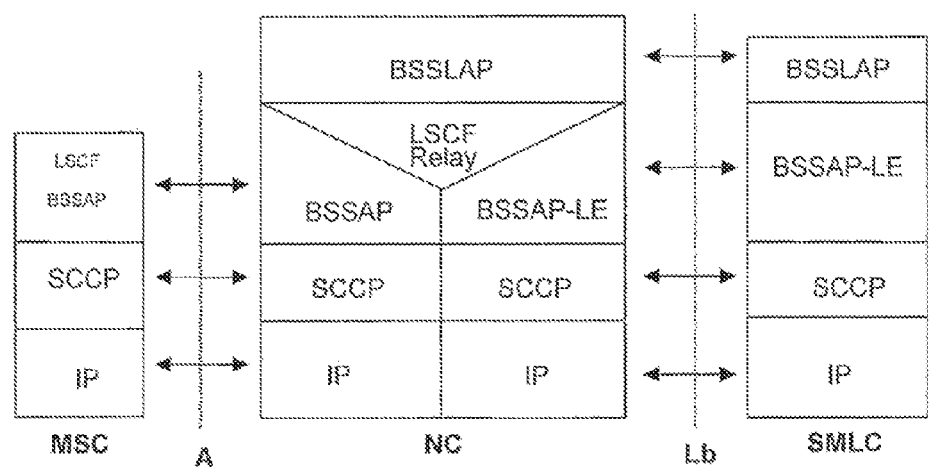
FIG. 4 is a functional block diagram that illustrates signaling protocols between a network controller and a serving mobile location center is an IP-based wireless telecommunications network.

FIG. 4 is a functional block diagram that illustrates signaling protocols between the SMLC, switch and NC. Each component includes an IP transport part, a signaling connection control part (SCCP), and a base station subsystem application part (BSSAP). The switch includes a location system control function (LSCF). The switch communicates with the NC through an interface (A). The SMLC communicates with the NC through a different interface (Lb).

The different pre-standard Lb interface messages and the parameters to support the NC-SMLC Lb interface and the NC database interface messages related to positioning are described in detail below. In each table the presence of specific data is qualified, where M=mandatory, C=conditional, and O=optional. An information element identified as conditional means that the element may be included in the message if the optional element located above it is included. For example, referring to Table 2, Location Estimate 1 may be included if mobile device or subscriber identifier is included.

Positioning Request

Positioning Request is a message that is sent from the SMLC to the NC. The Positioning Request message requests that the NC return the specific control information. The Positioning Request message contains the following information elements.

TABLE 1

Positioning Request message content

| Information element | Presence | NC Support | SMLC support |
|---|---|---|---|
| Message Type | M | | |

Positioning Response

Positioning Response is a message that is sent from the NC to the SMLC. The Positioning Response message is a response to the positioning request message. The Positioning Response message contains the following information elements.

TABLE 2

Positioning Response message content

| Information element | Presence | NC Support | SMLC support |
|---|---|---|---|
| Message Type | M | | |
| NC Control Channel Description | M | | |
| Device Identifier/IMSI | O | | |
| Location Estimate1 | C | | |
| UnCertanity1 | C | | |
| Positioning Data1 | C | | |
| AP Radio Identifier (MAC address) | O | | |
| Location Estimate2 | C | | |
| UnCertanity2 | C | | |
| Positioning Data2 | C | | |
| IP address of AP | O | | |
| UnCertanity3 | C | | |
| Location Estimate3 | C | | |
| Positioning Data3 | C | | |
| Cellular coverage indication | M | | |
| Cellular CGI | O | | |
| IP-based CGI | O | | |

Reset

Reset is a message that is sent from the NC to the SMLC. The Reset message is sent when the response message contents for a positioning request are invalidated before the positioning procedure was completed. The following are expected cause values for the reset message: failure for other radio related events; supervision timer expired; incorrect serving cell identity; and handover. The Reset message contains the following information elements.

TABLE 3

Reset message content

| Information element | Presence | NC Support | SMLC support |
|---|---|---|---|
| Message Type | M | | |
| Cell ID | M | | |
| NC Control Channel description | M | | |
| Cause | M | | |
| Location Area Code (LAC) | O | | |

Reject

Reject is a message that is sent from the NC to the SMLC. The Reject message is a possible response to the positioning request. The following are expected cause values for the Reject message: congestion; channel mode not supported; positioning procedure not supported; failure for other radio related events; incorrect serving cell identity; and segmentation error. The Reject message contains the following information elements.

TABLE 4

Reject message content

| Information element | Presence | NC Support | SMLC support |
|---|---|---|---|
| Message Type | M | | |
| Cause | M | | |

Abort

Abort is a message that is sent either from the NC to the SMLC, or from the SMLC to the NC. Upon receiving the Abort message, the SMLC or NC aborts the ongoing positioning procedure. The following are expected cause values for the Abort message: failure for other radio related events; supervision timer expired; and loss of signaling connection to MS. The Abort message contains the following information elements.

TABLE 5

Abort message content

| Information element | Presence | NC Support | SMLC support |
|---|---|---|---|
| Message Type | M | | |
| Cause | M | | |

DB Location Request

DB Location Request is a message that is sent from the NC to the NC database. The DB Location Request message requests that the NC database return a location estimation. The DB Location Request message contains the following information elements.

TABLE 6

Data Base Location Request message content

| Information element | Presence | NC Support | NC DB support |
|---|---|---|---|
| Message Type | M | | |
| Device Identifier/IMSI | O | | |
| AP Radio Identifier (MAC address) | O | | |
| IP address of AP | O | | |

DB Location Response

DB Location Response is a message that is sent from the NC database to the NC. The DB Location Response message contains the following information elements.

TABLE 7

DB Location Response message content

| Information element | Presence | NC Support | NC DB support |
|---|---|---|---|
| Message Type | M | | |
| Device Identifier/IMSI | O | | |
| Location Estimate1 | C | | |
| UnCertanity1 | C | | |
| Positioning Data1 | C | | |
| AP Radio Identifier (MAC address) | O | | |
| Location Estimate2 | C | | |
| UnCertanity2 | C | | |
| Positioning Data2 | C | | |
| IP address of AP | O | | |
| UnCertanity3 | C | | |
| Location Estimate3 | C | | |
| Positioning Data3 | C | | |
| Cellular CGI | O | | |
| IP-based CGI | O | | |

NC Database Abort

NC Database Abort is a message that is seat either from the NC database to the NC, or from the NC to the NC database. The NC Database Abort message contains the following information elements.

TABLE 7

NC Database Abort message content

| Information element | Presence | NC Support | NC DB Support |
|---|---|---|---|
| Message type | M | | |
| Transaction_ID | M | | |
| Cause | M | | |

Figure 5:
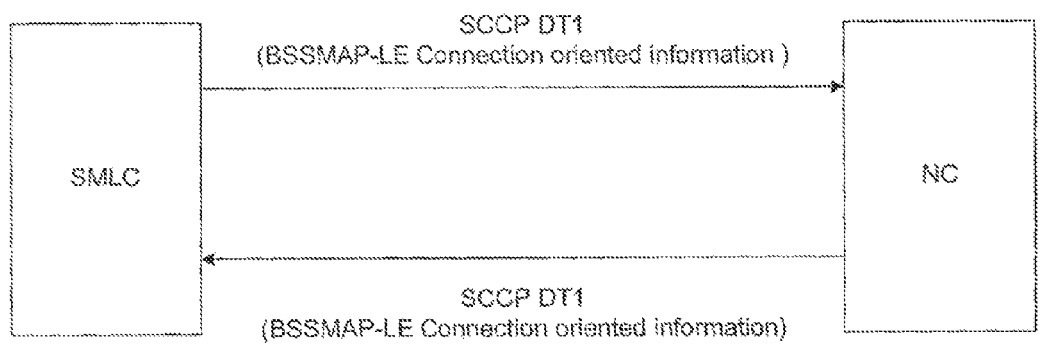
FIG. 5 is a functional block diagram that illustrates information transfer between a network controller and a serving mobile location center in an IP-based wireless telecommunications network.

FIG. 5 is a functional block diagram that illustrates the transfer of information between the SMLC and the NC. The positioning request is received at the NC. The NC serves as a particular target mobile subscriber. The SMLC obtains information related to the location of the mobile device from the NC.

The SMLC passes a base station subsystem application part-location extraction (BSSAP-LE) connection oriented information message to the NC. The NC contains an embedded BSSLAP-LE message. BSSLAP defines the SMLC-BSS layer 3 protocol. The BSSAP-LE message is transferred using an SCCP connection that was previously established between the SMLC and NC when the positioning request for the target MS was initially sent to the SMLC. The NC recognizes that it is the final destination due to the presence of the embedded BSSLAP message.

When the NC has positioning information for the target mobile subscriber to return the SMLC, the NC sends a BSSAP-LE connection oriented message to the SMLC containing an embedded BSSLAF message. The message is sent using the SCCP connection previously established for locating the target mobile device.

Figure 6:
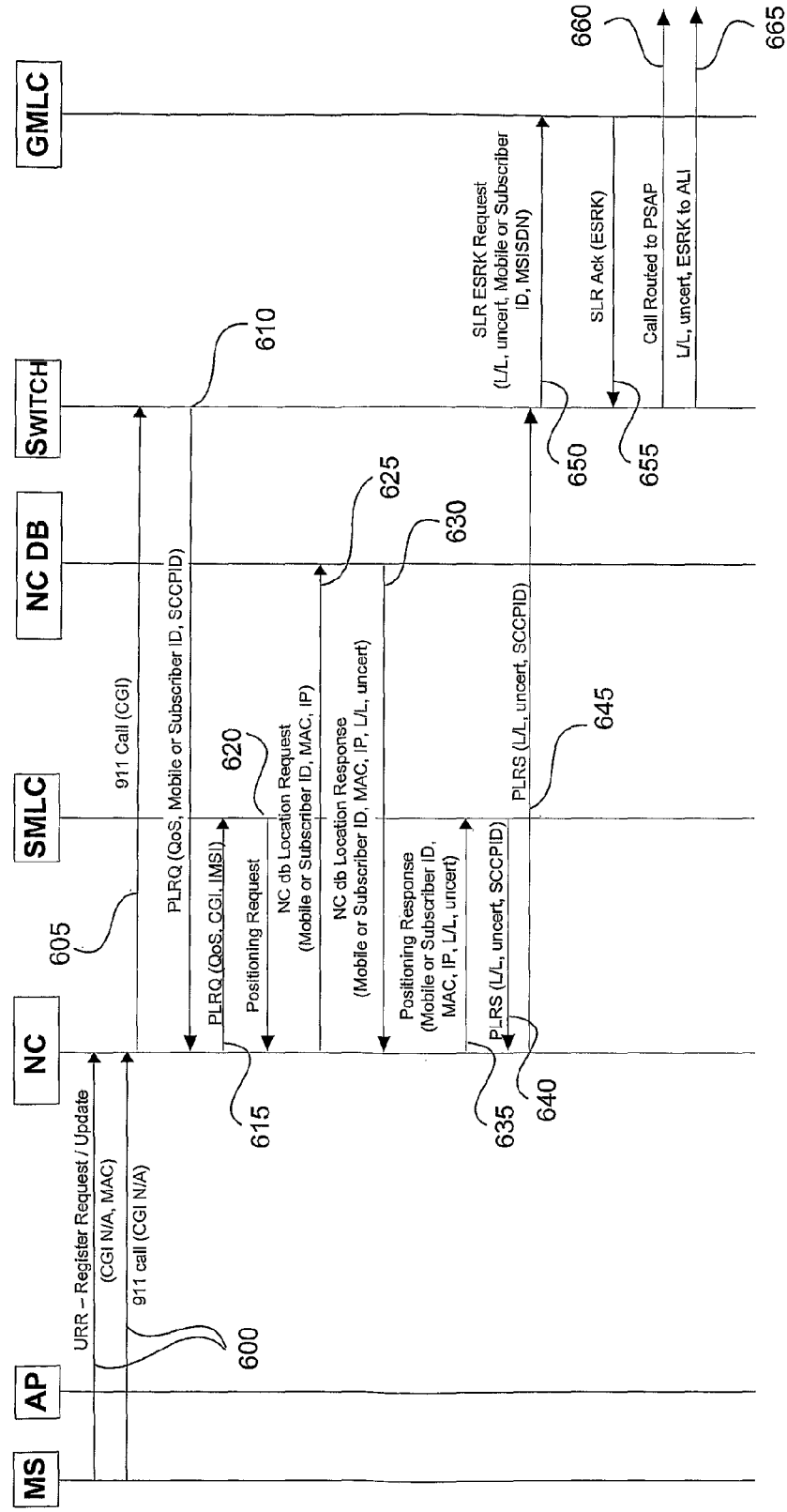
FIG. 6 is a state diagram feat illustrates the transfer of information between system components when a 911 or "emergency" call is executed by a mobile device in an IP-based wireless telecommunications network.

FIG. 6 is a state flow diagram that illustrates the transfer of information between system components when a 911 or "emergency call" is executed from a mobile device over an IP-based wireless telecommunication network.

Step 600: The mobile subscriber (MS) registers for access as a wireless device using an IP-based telecommunications network. The registration process is initiated between the MS and the network controller (NC) via the access point (AP). The MS also identifies a wireless radio resource (e.g. a GSM CGI radio resource) and a corresponding MAC address during the registration request. The mobile subscriber dials 911, which is communicated to the NC.

Step 605: The NC forwards the 911 call to the switch for routing. The cell global identity (CGI) associated with the mobile subscriber (MS) are forwarded to the switch for further processing.

Step 610: The switch sends a PLRQ message to the NC based on the received 911 call. The PLRQ includes mobile subscriber information associated with quality of service (QoS), device or subscriber identifier, and an SCCP identifier. The device identifier is registered with the network when the mobile subscriber (MS) accesses the network.

Step 615: The NC forwards the PLRQ to the SMLC. The PLRQ includes QoS, CGI, and device or subscriber identifier information for the mobile device.

Step 620: The SMLC sends a positioning request message to the NC.

Step 625: The NC sends a location request message to the NC database. The location request message includes mobile subscriber information for the device identifier that is associated with the mobile device, a MAC address associated with the access point, and an IP address associated with the access point.

Step 630: The NC database provides one or more locations information to the NC in the form of a location response message, which may include the subscriber's address, access point location and public IP address serving area. The NC database may also provide an uncertainty rating that provides the likelihood that the identified location of the mobile subscriber is accurate.

Step 635: The NC sends a positioning response message to the SMLC, where the positioning response message includes all the locations information from the NC database to the SMLC. The SMLC executes an algorithm to calculate the location of the mobile device using the information received above to get the final latitudinal-longitudinal coordinates and the uncertainty rating.

Step 640: The SMLC returns the calculated location information to the NC via a PLRS message. The PLRS message includes the latitudinal-longitudinal coordinates, the uncertainty rating and the SCCP identifier.

Step 645: The NC forwards the PLRS message with the location information to the switch.

Step 650: The switch communicates an SLR ESRK Request message to the gateway mobile location center (GMLC), which requests a determination of PSAP information based on the location of the mobile device.

Step 655: The GMLC communicates an SLR Ack message, which returns PSAP information with an emergency service routing key (ESRK).

Step 660: The switch routes the call to the proper PSAP based on ESRK received from GMLC.

Step 665: The location of the mobile device is delivered to an application location interlace (ALI) for the PSAP access.

Figure 7:
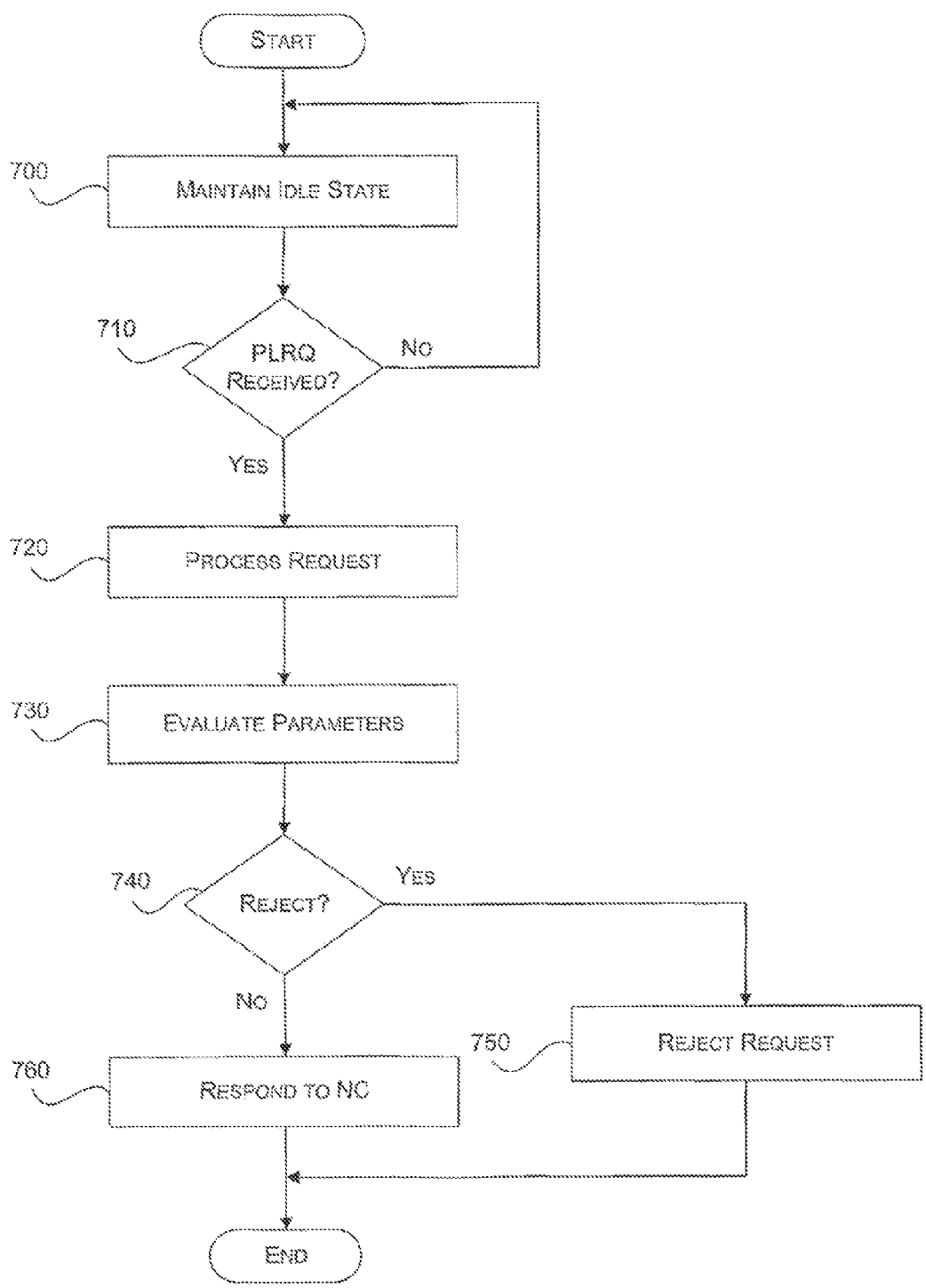
FIG. 7 is an operational flow diagram illustrating a process for determining a mobile device location from the perspective of a serving mobile location center in an IP-based wireless telecommunications network.

FIG. 7 is an operational flow diagram illustrating a process for determining a mobile device location from the perspective of the SMLC. The SMLC maintains an idle state at block 700.

Continuing to decision block 710, a determination is made whether a PLRQ message is received from the NC. If a PLRQ message is not received, processing continues at block 700 where the SMLC waits in an idle state for the PLRQ message. If a PLRQ message is received, processing continues at block 720.

The request is processed at block 720. The SMLC sends a positioning request message to the NC. The NC returns a positioning response message to the SMLC.

Moving to block 730 the parameters are evaluated. The SMLC executes an algorithm to calculate the location of the mobile device using at least one of: the subscriber's address based on the device or subscriber identifier; the access point (AP) location based on the MAC address associated with the access point; the serving area of the IP address associated with the access point; the uncertainty rating for each of the above locations, or any other combination thereof.

Advancing to decision block 740, a determination is made whether to reject the request. If the request is to be rejected, processing continues to block 750 where the request is rejected. Otherwise, processing proceeds to block 760 where the SMLC returns the location information to the NC via a PLRS message.

Figure 8:
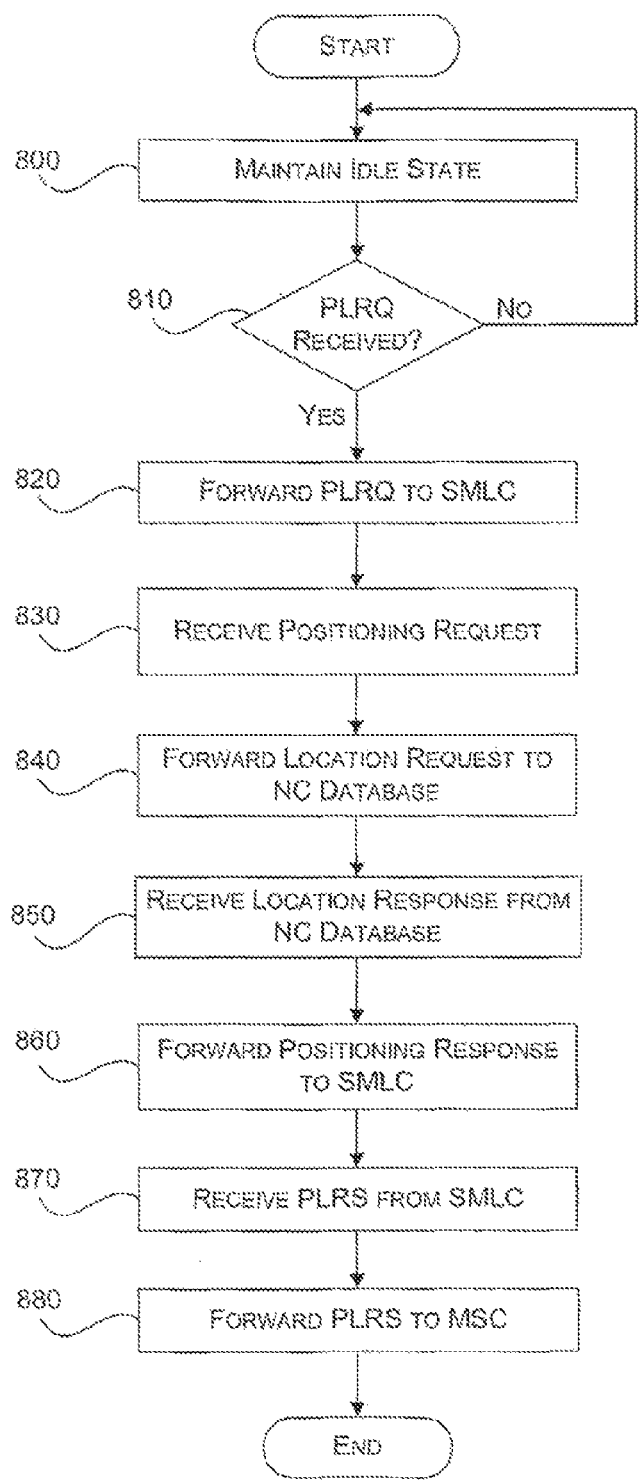
FIG. 8 is an operational flow diagram illustrating a process for determining a mobile device location from the perspective of a network controller in an IP-based wireless telecommunications network.

FIG. 8 is an operational flow diagram illustrating a process for determining a mobile device location from the perspective of the NC. The NC maintains an idle state at block 800. Continuing to decision block 810, a determination is made whether a PLRQ message is received from the switch. If a PLRQ message is not received, processing continues at block 800 where the NC waits in an idle state for the PLRQ message. If a PLRQ message is received, processing continues at block 820.

The NC forwards the PLRQ message to the SMLC at block 820. Continuing to block 830, the NC receives a positioning request message from the SMLC. Advancing to block 840, the NC forwards a location request message to the NC database. Moving to block 850, the NC receives a location response message from the NC database. The location response message includes either: the subscriber's address based on the device identifier associated with the mobile device, the access point location based on the MAC address associated with the access point, the serving area of the IP address associated with the access point; or the uncertainty rating for each of the above locations.

Proceeding to block 860, the NC forwards a positioning response message to the SMLC. Transitioning to block 870, the NC receives a PLRS message from the SMLC. The PLRS message includes the location information for the mobile device (e.g., latitudinal-longitudinal information, uncertainty ratings and SCCPID). The NC forwards the PLRS message with the location information to the switch at block 880.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A network element for determining a location associated with a mobile device in an IP-based wireless telecommunications network, the network element comprising:
   an interface configured to communicate with a network controller, wherein the interface is further configured to:
      receive a first message comprising a mobile device location request from the network controller,
         wherein the mobile device location request is associated with a mobile device that is communicatively coupled to an IP-based wireless telecommunications network via an access point, and
         wherein the IP-based wireless telecommunications network includes the network controller;
      transmit a second message to the network controller,
         wherein the second message includes a request for location information from a network controller database;
      receive location information from the network controller database via a third message,
         wherein the third message comprises a reply to the second message,
         wherein the third message comprises a plurality of information elements, and wherein the information elements include:
            a MAC address associated with the mobile device;
            a first location uncertainty value associated with the MAC address;
            a serving area associated with an IP address associated with the access point; and
            a second location uncertainty value associated with the serving area;
      receive a calculation from a network component,
         wherein the calculation includes an estimated geographic position of the mobile device partially based on the MAC address, the first location uncertainty value, the serving area, and the second location uncertainty value; and
      provide the estimated geographic position to the network controller,
         wherein the provided estimated geographic position includes a latitude estimate and longitude estimate.

2. The network element of claim 1, wherein the network component is a serving mobile location center (SMLC).

3. The network element of claim 1, wherein the interface is further configured to form a signaling connection control part (SCCP) connection with the network controller.

4. The network element of claim 3, wherein the second message is a base station subsystem application part-location extraction (BSSAP-LE) connection oriented information message.

5. The network element of claim 1, wherein the first message comprises a perform location request message and wherein the second message comprises a positioning request message.

6. The network element of claim 1, wherein providing the calculated estimated geographic position to the network controller causes the network controller to send a instructions to a switch to route a call placed by the mobile device.

7. A method for determining a location associated with a mobile device in an IP-based wireless telecommunications network, the method comprising:
receiving a first message comprising a mobile device location request from a network controller,
wherein the mobile device location request is associated with a mobile device that is communicatively coupled to an IP-based wireless telecommunications network via an access point, the IP-based wireless telecommunications network including the network controller;
transmitting a second message to the network controller, the second message including a request for location information from a network controller database;
receiving location information from the network controller database via a third message, the third message comprising a reply to the second message, the third message further comprising a plurality of information elements, the information elements including:
a MAC address associated with the mobile device;
a first location uncertainty value associated with the MAC address;
a serving area associated with an IP address associated with the access point; and
a second location uncertainty value associated with the serving area;
calculating an estimated geographic position of the mobile device partially based on the MAC address, the first location uncertainty value, the serving area, the second location uncertainty value; and
providing the estimated geographic position to the network controller,
wherein the provided estimated geographic position includes a latitude estimate and longitude estimate.

8. The method of claim 7, wherein calculating the estimated geographic position of the mobile device is performed by a serving mobile location center (SMLC).

9. The method of claim 7, further comprising forming a signaling connection control part (SCCP) connection with the network controller.

10. The method of claim 9, wherein the second message is a base station subsystem application part-location extraction (BSSAP-LE) connection oriented information message.

11. The method of claim 7, wherein the first message comprises a perform location request message and wherein the second message comprises a positioning request message.

12. The method of claim 7, wherein providing the calculated estimated geographic position to the network controller causes the network controller to send instructions to a switch to route a call placed by the mobile device.

13. A non-transitory computer readable storage medium having instructions, which when executed by a processor, cause a device to perform a method for determining a location associated with a mobile device in an IP-based wireless telecommunications network, the method comprising:
receiving a mobile device location request from a network controller,
wherein the mobile device location request is associated with a mobile device that is communicatively coupled to an IP-based wireless telecommunications network via an access point, the IP-based wireless telecommunications network including the network controller;
determining a MAC address associated with the mobile device;
determining a serving area associated with an IP address associated with the access point;
transmitting a request for location information to a network controller database;
receiving a reply to the request from the network controller database, the reply including:
a first location uncertainty value associated with the MAC address;
a second location uncertainty value associated with the serving area;
calculating an estimated geographic position of the mobile device partially based on the MAC address, the first location uncertainty value, the serving area, and the second location uncertainty value; and
providing the estimated geographic position to the network controller,
wherein the provided estimated geographic position includes a latitude estimate and longitude estimate.

14. The non-transitory computer readable method of claim 13, wherein the method further comprises: sending routing instructions to a switch for routing a call placed by the mobile device based on the estimated geographic position.

15. The non-transitory computer readable method of claim 13, wherein the calculating the estimated geographic position of the mobile device is performed by a serving mobile location center (SMLC).

16. The non-transitory computer readable method of claim 13, wherein the mobile device is communicatively coupled to a Global System for Mobile Communications (GSM) network.

17. The non-transitory computer readable method of claim 13, the method further comprising:
determining to reject the request for location information prior to transmitting the request partially based on mobile device subscriber information; and
in response to rejecting the request, sending a notification to the mobile device that the request has been rejected.

18. The non-transitory computer readable method of claim 13, the method further comprises:
sending the estimated geographic position to a public safety answering point (PSAP).

19. The non-transitory computer readable method of claim 13, wherein the IP-based network is at least one of the following: IEEE 802.16 (WiMAX), IEEE 802.20 Mobile Broadband Wireless Access (MBWA), Ultra Wideband (UWB), or 802.11 wireless fidelity (Wi-Fi).

20. The non-transitory computer readable method of claim 13, wherein the access point is public or private, and wherein the access point is located in at least one of following locations: a subscriber's home or a corporate office.

* * * * *